United States Patent
Halder et al.

(10) Patent No.: US 9,011,583 B2
(45) Date of Patent: Apr. 21, 2015

(54) ARTICLE FOR $CO_2$ CAPTURE HAVING HEAT EXCHANGE CAPABILITY

(75) Inventors: Amit Halder, Ithaca, NY (US); Dayue David Jiang, Painted Post, NY (US); Weiguo Miao, Horseheads, NY (US); Steven Bolaji Ogunwumi, Painted Post, NY (US); Zhen Song, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 113 days.

(21) Appl. No.: 13/097,495

(22) Filed: Apr. 29, 2011

(65) Prior Publication Data

US 2012/0272823 A1    Nov. 1, 2012

(51) Int. Cl.
| | | |
|---|---|---|
| *B01D 53/02* | (2006.01) | |
| *B05D 7/22* | (2006.01) | |
| *B01J 20/28* | (2006.01) | |
| *B01D 53/04* | (2006.01) | |
| *B01J 20/34* | (2006.01) | |

(52) U.S. Cl.
CPC ............ *B01J 20/28097* (2013.01); *Y02C 10/08* (2013.01); *B01D 53/0407* (2013.01); *B01D 53/0462* (2013.01); *B01D 2253/108* (2013.01); *B01D 2257/504* (2013.01); *B01D 2259/65* (2013.01); *B01J 20/3483* (2013.01); *B01J 20/28045* (2013.01); *B01D 53/02* (2013.01); *B01D 2253/342* (2013.01)

(58) Field of Classification Search
CPC .................. B01D 2253/108; B01D 2253/342; B01D 2257/504; B01D 2259/65; B01D 53/02; B01D 53/0407; B01D 53/0462; B01J 220/28045; B01J 20/28097; B01J 20/3483; Y02C 10/08

USPC ................... 95/139; 96/108, 129, 134, 154; 55/DIG. 5
See application file for complete search history.

(56) References Cited

U.S. PATENT DOCUMENTS

| | | | |
|---|---|---|---|
| 4,368,776 A | 1/1983 | Negita et al. | 165/133 |
| 4,702,963 A | 10/1987 | Phillips et al. | 428/426 |
| 5,006,377 A | 4/1991 | Delcorps et al. | 428/34.7 |
| 6,565,627 B1 * | 5/2003 | Golden et al. | 95/96 |
| 6,716,275 B1 | 4/2004 | Reed et al. | 96/10 |
| 6,908,497 B1 | 6/2005 | Sirwardane | 95/136 |
| 7,135,424 B2 | 11/2006 | Worley et al. | 442/131 |
| 7,344,770 B2 | 3/2008 | Hirai et al. | 428/116 |

(Continued)

FOREIGN PATENT DOCUMENTS

| | | |
|---|---|---|
| DE | 102007031416 | 1/2008 |
| EP | 0432438 | 6/1991 |

(Continued)

*Primary Examiner* — Duane Smith
*Assistant Examiner* — Cabrena Holecek
(74) *Attorney, Agent, or Firm* — Michael A. Hood (57) ABSTRACT

An article comprising a plurality of intersecting walls having outer surfaces that define a plurality of cells extending from one end to a second end, wherein the walls forming each cell in a first subset of cells are covered by a barrier layer to form a plurality of heat exchange flow channels, and wherein the walls forming each cell in a second subset of cells different from the first subset of cells, comprise a $CO_2$ sorbent and form reaction flow channels. Heat exchange flow channels allow quick and uniform heating and cooling of the sorbent body. The article may be useful, for example, for removing $CO_2$ from a gas stream.

23 Claims, 9 Drawing Sheets

(56) References Cited

U.S. PATENT DOCUMENTS

| | | | |
|---|---|---|---|
| 2005/0037147 A1 | 2/2005 | Ogunwumi et al. | 427/393.6 |
| 2005/0061483 A1* | 3/2005 | Dunne et al. | 165/104.12 |
| 2005/0181172 A1 | 8/2005 | Hirai et al. | 428/116 |
| 2007/0122609 A1 | 5/2007 | Hiltzik et al. | 428/304.4 |
| 2007/0142208 A1* | 6/2007 | Addiego et al. | 501/109 |
| 2008/0202107 A1 | 8/2008 | Boorse et al. | 60/301 |
| 2008/0277819 A1 | 11/2008 | Ichikawa | 264/211.12 |
| 2008/0282888 A1* | 11/2008 | Deckman et al. | 95/126 |
| 2008/0314244 A1 | 12/2008 | Kelley et al. | 95/41 |
| 2009/0000475 A1* | 1/2009 | Fekety et al. | 95/105 |
| 2009/0110873 A1 | 4/2009 | Jiang et al. | 428/116 |
| 2009/0139193 A1 | 6/2009 | Garcia et al. | 55/523 |
| 2010/0119747 A1 | 5/2010 | Rockenfeller et al. | 428/36.4 |
| 2010/0212495 A1 | 8/2010 | Gadkaree et al. | 95/139 |
| 2010/0326272 A1* | 12/2010 | Asaro et al. | 95/11 |
| 2011/0219802 A1 | 9/2011 | Minhas et al. | 62/238.3 |
| 2011/0268635 A1 | 11/2011 | Boorse et al. | 423/213.7 |
| 2014/0271394 A1 | 9/2014 | Jiang et al. | 422/180 |

FOREIGN PATENT DOCUMENTS

| | | | |
|---|---|---|---|
| EP | 0700718 | 3/1996 | |
| EP | 2098285 | 9/2009 | |
| JP | 1993309358 | 11/1993 | |
| WO | 2008/143826 | 11/2008 | B01D 53/04 |
| WO | 2008/143968 | 11/2008 | B01D 53/04 |
| WO | WO2008/143826 | 11/2008 | |
| WO | WO2008/143966 | 11/2008 | |
| WO | WO2008/143968 | 11/2008 | |
| WO | WO2008143966 | 11/2008 | |
| WO | 2010/024935 | 3/2010 | B01J 10/02 |
| WO | WO2010/024935 | 3/2010 | |
| WO | WO2012030557 | 3/2012 | |

* cited by examiner

ARTICLE FOR $CO_2$ CAPTURE HAVING HEAT EXCHANGE CAPABILITY

FIELD OF THE DISCLOSURE

This disclosure relates to an article comprising a first subset of cells forming a plurality of heat exchange flow channels and a second subset of cells forming reaction flow channels. The article may be useful, for example, for removing $CO_2$ from a gas stream.

BACKGROUND $CO_2$ capture by solid sorbent can be realized by processes such as thermal swing, pressure swing, or vacuum swing. Due to the large quantity of $CO_2$ released from coal fire plants, a large amount of sorbent is generally needed for $CO_2$ capture. A honeycomb structure sorbent bed may solve the high pressure drop problem for fixed bed adsorption using a large amount of sorbent; but uniform and fast heating and cooling of the sorbent bed is still a challenge.

In $CO_2$ solid sorbent capture, known processes mentioned above involve two steps: adsorption and desorption (or regeneration); and known processes involve sorbent bed temperature change. In thermal swing adsorption (TSA) processes, the sorbent adsorbs at a lower temperature and is then heated for desorption; after the desorption, the sorbent needs to be cooled down to a lower temperature for adsorption again. For vacuum and pressure swing adsorption (VSA and PSA) processes, the adsorption, an exothermal process, is accompanied with an temperature increase of the sorbent bed, which eventually prohibits the adsorption, or in other words, decreases the sorbent $CO_2$ capacity; while the desorption, an endothermal process, is accompanied with a decrease of the sorbent bed temperature, and therefore, slows down the desorption process.

SUMMARY

Disclosed herein is an article for removing $CO_2$ from a gas stream, the article comprising a plurality of intersecting walls having outer surfaces that define a plurality of cells extending from one end to a second end, wherein the walls forming each cell in a first subset of cells are covered by a barrier layer to form a plurality of heat exchange flow channels, and wherein the walls forming each cell in a second subset of cells different from the first subset of cells, form reaction flow channels.

Also disclosed is a method of making an article for removing $CO_2$ from a gas stream, the method comprising providing a substrate comprising intersecting walls having outer surfaces that define a plurality of cells extending from one end to a second end, wherein the intersecting walls have a median pore size greater than 10 microns, wherein the porosity of the intersecting walls is greater than 50 percent, impregnating the intersecting walls with a solid sorbent capable of adsorbing $CO_2$, wherein the amount of solid sorbent in the intersecting walls is greater than 150 grams per liter of substrate, masking the ends of selected cells of the substrate, applying a barrier layer on the intersecting walls of the unmasked cells, removing the mask, and drying, and optionally firing, the article.

Also disclosed is a method of removing $CO_2$ from a gas stream, the method comprising passing through and contacting a gas stream comprising $CO_2$ with the reaction flow channels of the article disclosed above resulting in $CO_2$ adsorption on the article, and flowing a cooling fluid through the heat exchange flow channels of the article, wherein the cooling fluid acts to remove the heat resulting from the adsorption of the $CO_2$.

Honeycomb sorbent beds disclosed herein can be used to heat and cool the sorbent bed quickly and uniformly for the TSA process and to stabilize or optimize the operation temperatures for both adsorption and desorption in VSA and PSA processes.

Additional features and advantages will be set forth in the detailed description which follows, and in part will be readily apparent to those skilled in the art from the description or recognized by practicing the embodiments as described in the written description and claims hereof.

It is to be understood that both the foregoing general description and the following detailed description are merely exemplary, and are intended to provide an overview or framework to understand the nature and character of the claims.

DETAILED DESCRIPTION

Disclosed herein is an article for removing $CO_2$ from a gas stream, the article comprising a plurality of intersecting walls having outer surfaces that define a plurality of cells extending from one end to a second end, wherein the walls forming each cell in a first subset of cells are covered by a barrier layer to form a plurality of heat exchange flow channels, and wherein the walls forming each cell in a second subset of cells different from the first subset of cells, comprise a $CO_2$ sorbent material and form reaction flow channels.

The article may comprise ceramic, glass, glass-ceramic, metal or combinations thereof. In some embodiments, the article comprises cordierite, mullite, alumina, zeolite, carbon/activated carbon, silicon carbide, stainless steel or combinations thereof. In some embodiments, the article may be formed from a sorbent material, for example, activated carbon or zeolite.

The surface of the intersecting walls forming each cell in the second subset of cells can be comprised of a porous material such as porous ceramics or carbon. In some embodiments, at least a majority of the intersecting walls are comprised of a porous material throughout the entire thickness of the wall, except for the barrier layer.

In some embodiments, the article is in the form of a honeycomb, the honeycomb comprising an inlet end, an outlet end, and cells extending from the inlet end to the outlet end. In some embodiments, the honeycomb has a cell density of from 100 cells per square inch to 5000 cells per square inch.

The intersecting walls define the cells of the article. In some embodiments, the intersecting walls, without a barrier layer, have a thickness of from 35 microns to 500 microns. The intersecting walls of the article are porous. Porous walls allow sorbent loading on and/or within the intersecting walls. In some embodiments, the article has high porosity and pore volume. In some embodiments, the intersecting walls have a porosity greater than 50 percent. In some embodiments, the intersecting walls have a porosity from 55% to 75%. In some embodiments, the intersecting walls have a median pore size (D50) greater than 10 microns, for example, 15 microns to 30 microns. In some honeycomb embodiments, the cell geometry is such that the pore volume percentage is in the range of 20-35%. The cell geometry can be designed so that the pore volume percentage in the article is not less than 20, not less that 30%, or not less than 35%.

Embodiments of the article have a void fraction, also described as the total void or voidage of the article. The term "void fraction" is defined as the cell void (open frontal area) plus wall porosity and particle porosity. The term solid porosity may be used to represent wall porosity and particle porosity combined. An applicable void fraction can be selected for the gas separation or capture application. For $CO_2$ or gas separation from an industrial gas process such as $H_2$ and natural gas, a low void fraction is applicable, for example, less than 85%, 80%, 75%, or 70%. For separation of $CO_2$ from air or flue gas applications, greater than 50%, 55%, 60%, 65%, or 70% is applicable. In some embodiments, the article has a void fraction less than 70%. In other embodiments, the article has a void fraction greater than 70%.

In some embodiments, the reaction flow channels and heat exchange flow channels have different cross-sectional areas. For example, the reaction flow channels of the article may be of a larger cross section than the heat exchange flow channels, or vice versa. The cross sectional shape of the reaction flow channels may also differ from the cross sectional shape of the heat exchange flow channels, for example, square, rectangle, triangular or circular cross sectional shapes may be present in the article.

Embodiments disclosed herein include a shaped body of sorbent material, a body impregnated with a solid sorbent, and a shaped body of sorbent material impregnated with a solid sorbent. In some embodiments, the solid sorbent impregnates the intersecting wall, for example, to a depth of at least 100 microns or more, 200 microns or more, or 300 microns or more. In some embodiments, the solid sorbent impregnates the entire thickness of the intersecting wall. In some embodiments, the amount of solid sorbent, or sorbent loading, is greater than 150 g/L, greater than 175 g/L, greater than 200 g/L, or greater than 250 g/L.

A barrier layer is used to create separate channels for heat exchange flow. The barrier layer is disposed on selected intersecting walls and prevents flow through the porous channel walls having the barrier layer disposed thereon. Intersecting walls having no barrier layer may allow flow through the intersecting walls. In some embodiments, the barrier layer comprises polymer, glass, wax, metal, ceramic, glass-ceramic, or combinations thereof. The barrier layer may be applied before or after sorbent loading.

In some embodiments, the barrier layer has a minimum thickness of 10 microns. In some embodiments, the barrier layer has a thickness from 10 microns to 100 microns, for example 10 microns to 90 microns, 20 microns to 80 microns, 30 microns to 70 microns, 40 microns to 50 microns, or 50 microns to 100 microns.

Figure 1:
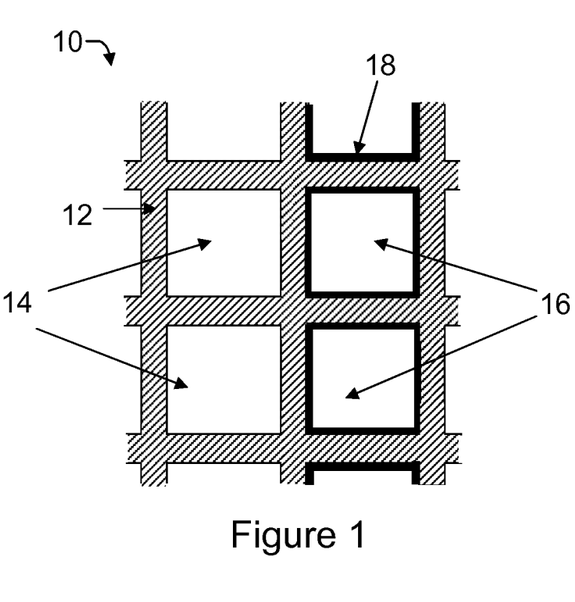
FIG. 1 is a partial view of one embodiment disclosed herein, showing reaction flow channels and heat exchange flow channels separated by barrier layer.

Reaction flow channels are defined herein as those cells not having a barrier layer on the intersecting walls defining the cell. Heat exchange flow channels are defined herein as those cells having a barrier layer on the intersecting walls defining the cell. The article may have one or multiple reaction flow channels. The article may have one or multiple heat exchange flow channels. FIG. 1 shows a partial view 10 of one embodiment of an article for removing $CO_2$ from a gas stream. Intersecting walls 12 define the cells. Intersecting walls 12 having a barrier layer 18 thereon define the heat exchange flow channels 16. The reaction flow channels 14 are defined by intersecting walls 12 having no barrier layer.

Figure 2:
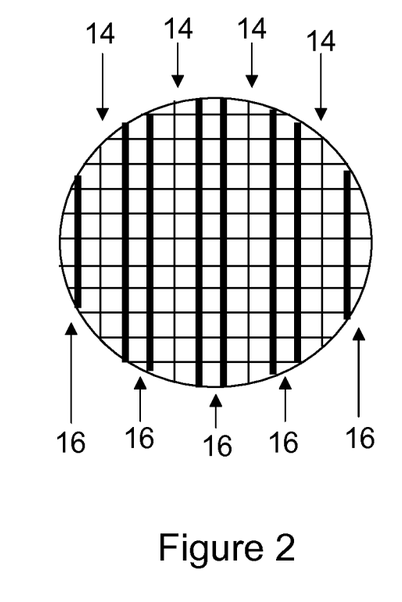
FIG. 2 is a cross-sectional view of one embodiment of an article disclosed herein showing different configurations for reaction flow and heat exchange flow channels.

FIG. 2 is an example showing a honeycomb embodiment having reaction flow channels 14 and heat exchange flow channels 16. Embodiments of the article may have different configurations of reaction and heat exchange flow channels.

Figure 3A:
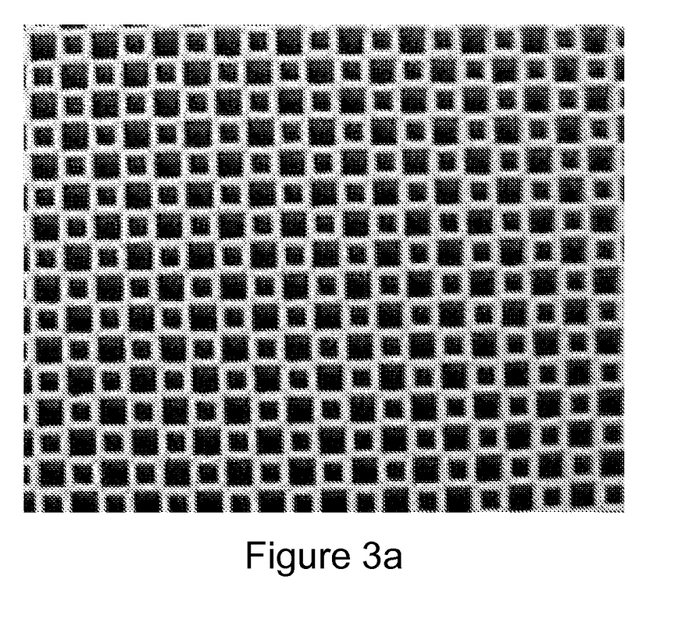
FIG. 3a is a cross-sectional view of one embodiment of an article disclosed herein showing flow channels having different cross-sectional areas.
Figure 3B:
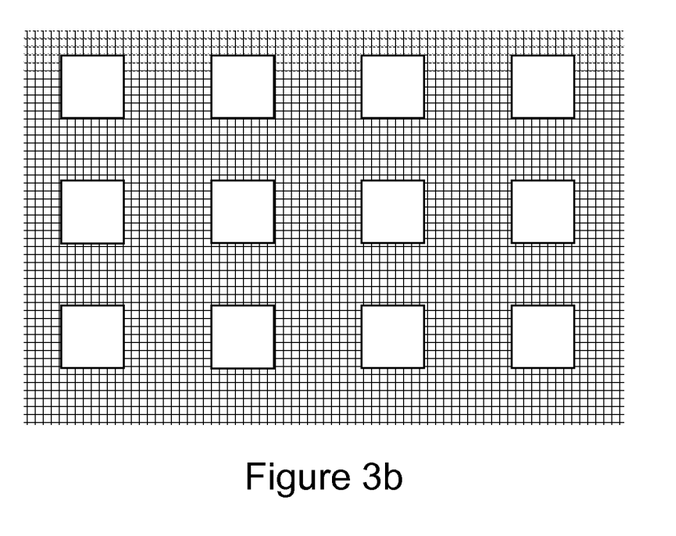
FIG. 3b is a cross-sectional view of one embodiment of an article disclosed herein showing flow channels having different cross-sectional areas.

In some embodiments, the reaction flow channels and heat exchange flow channels have different cross-sectional areas. For example, the reaction flow channels of the article may be of a larger cross section than the heat exchange flow channels, or vice versa. FIG. 3a is a cross sectional view of an embodiment of the article showing intersecting walls (light gray) defining cells (black) having different cross-sectional areas. FIG. 3b shows a cross-sectional view of another embodiment of the article having larger cells among smaller cells. In the embodiment shown in FIG. 3b, the larger cells may, for example, function as the heat exchange flow channels, and the smaller cells may, for example, function as the reaction flow channels. The cross sectional shape of the reaction flow channels may also differ from the cross sectional shape of the heat exchange flow channels, for example, square, rectangle, triangular or circular cross sectional shapes may be present in the article.

Disclosed herein is a method of making an article for removing $CO_2$ from a gas stream, the method comprising providing a substrate comprising intersecting walls having outer surfaces that define a plurality of cells extending from one end to a second end, wherein the intersecting walls have a median pore size greater than 10 microns, wherein the porosity of the intersecting walls is greater than 50 percent, impregnating the intersecting walls with a solid sorbent capable of adsorbing $CO_2$, wherein the amount of solid sorbent in the intersecting walls is greater than 150 grams per liter of substrate, masking the ends of selected cells of the substrate, applying a barrier layer on the intersecting walls of the unmasked cells, removing the mask, and drying, and optionally firing, the article.

The substrate may comprise ceramic, glass, glass-ceramic, metal or combinations thereof. In some embodiments, the substrate comprises cordierite, mullite, alumina, carbon/activated carbon, silicon carbide, stainless steel or combinations thereof. In some embodiments, the substrate may be formed from a sorbent material, for example, activated carbon or zeolite.

In some embodiments, the substrate is in the form of a honeycomb, the honeycomb comprising an inlet end, an outlet end, and open channels extending from the inlet end to the outlet end. In some embodiments, the honeycomb has a channel or cell density of from 100 cells per square inch to 5000 cells per square inch.

Intersecting walls define a plurality of cells in the substrate. In some embodiments, the intersecting walls have a thickness of from 35 microns to 500 microns. Porous intersecting walls allow sorbent loading on and/or within the porous intersecting walls. In some embodiments, the substrates have high porosity and pore volume. In some embodiments, the intersecting walls have a porosity greater than 50 percent. In some embodiments, the intersecting walls have a porosity from 55% to 75%. In some embodiments, the intersecting walls have a median pore size (D50) greater than 10 microns, for example, 15 microns to 30 microns. In some honeycomb embodiments, the cell geometry is such that the pore volume percentage is in the range of 20-35%.

In some embodiments, the substrate may also be considered a sorbent body, for example when the substrate is made of a sorbent material such as activated carbon or zeolite. In other embodiments, the substrate becomes a sorbent body after impregnation with a solid sorbent.

In some embodiments, the intersecting walls are impregnated with a solid sorbent capable of adsorbing $CO_2$. The solid sorbent may be present on or in intersecting walls as well as inner pores of the intersecting walls. Impregnation may be accomplished, for example, via slurry coating. The viscosity of the slurry comprising the solid sorbent should be low enough to enable the slurry to easily flow into the pores of the walls. For example, slurry viscosities smaller than 1.5 Pc may be used. In some embodiments, more than one coating cycle may be used. In some embodiments, the solid sorbent impregnates the intersecting wall, for example, to a depth of at least 100 microns or more, 200 microns or more, or 300 microns or more. In some embodiments, the solid sorbent impregnates the entire thickness of the intersecting wall. In some embodiments, the amount of solid sorbent, or sorbent loading, is greater than 150 g/L, greater than 175 g/L, greater than 200 g/L, or greater than 250 g/L. For example, a honeycomb having a porosity of 65% with cell geometry of 300 cpsi (cells per square inch) and wall thickness of 13 mil (1.09 mm), the pore volume percentage of the honeycomb is 26%. If loading a sorbent with density of 1.5 $g/cm^3$, the honeycomb can load up to 390 g/L sorbent.

The solid sorbent capable of adsorbing $CO_2$ may be a porous solid with an affinity and high selectivity for $CO_2$. In some embodiments, the solid sorbent may be a molecular sieve such as a zeolite, or a molecular sieve that is occluded with a functionality that also has an affinity for $CO_2$. In some embodiments, the solid sorbent may be carbon or carbon material functionalized with an organic group that complexes $CO_2$. The solid sorbent may also be a mixture of a carbon/zeolite, metal-organic frameworks, and combinations thereof.

In embodiments, a barrier layer is applied to intersecting walls of the substrate. The barrier layer may be applied before or after sorbent impregnation. In some embodiments, the barrier layer comprises polymer, glass, wax, metal, ceramic, glass-ceramic, or combinations thereof.

A polymer barrier layer may be realized by monomer coating and then cross-linking at the surface of the intersecting wall, or a polymer particle coating and then melting polymer particle coating to form the barrier layer. A glass barrier layer may be a slip casting of glass frit slurry. This slurry may be made by glass frit of particle size of 0.1 microns to 10 microns in water, added with polymer binder and dispersant and deforming agent. Flow coating, vacuum coating, dip coating, or water fall coating may be used for slip casting of the glass frit on the intersecting walls.

For applications of a glass barrier layer after sorbent loading, low melting temperature glass should be chosen for the barrier layer to meet the sorbent thermal stable temperature range and prevent thermal degradation of the sorbent. For applications of a glass barrier layer before sorbent loading, the pores of the intersecting walls should be pre-filled or plugged, and then the glass frit applied. A glass barrier layer may also be applied to green bodies. In some embodiments, the slurry is not water based due to the solubility of polymer binder in green parts. Alcohol may be used to make the slurry in this case. In other embodiments, water base slurry can be using for glass frit barrier layer if the green part is treated with cross-linking agent and a polymer film formed on the surface of the green part.

In embodiments where a barrier layer is only applied to selected intersecting walls, a mask may be used to block the ends of cells not selected for application of the barrier layer, thereby preventing the barrier layer from being applied to the walls within the blocked cells. In some embodiments, a patterned mask may be glued at the two outer ends of the substrate before the applying the barrier layer. After applying the barrier layer, the mask may be removed and the substrate may undergo drying, and optionally firing. In embodiments where glass frits are used, a firing temperature higher than the glass melting temperature allows the glass frits to melt and form an acceptable glass barrier layer.

Disclosed herein is a method of removing $CO_2$ from a gas stream, the method comprising passing through and contacting a gas comprising $CO_2$ with the reaction flow channels of an article comprising a plurality of intersecting walls having outer surfaces that define a plurality of cells extending from one end to a second end, wherein the walls forming each cell in a first subset of cells are covered by a barrier layer to form a plurality of heat exchange flow channels, and wherein the walls forming each cell in a second subset of cells different from the first subset of cells, form reaction channels, wherein the contacting step results in $CO_2$ adsorption on the article; and flowing a cooling fluid through the heat exchange flow channels of the article; wherein the cooling fluid acts to remove the heat resulting from the adsorption of the $CO_2$.

A gas may pass through and contact the reaction flow channels of the article from an inlet end to an outlet end. As used herein, the terms "sorb", "sorption", and "sorbed", refer to the adsorption, sorption, or other entrapment of $CO_2$ on the article, either chemically, physically, or both chemically and physically. During adsorption, at least a portion of $CO_2$ is removed from the gas stream, for example, some, or all of the $CO_2$. In some embodiments, the article removes at least 5%, at least 10%, at least 20%, at least 50%, at least 70%, or at least 90% of the $CO_2$ from the gas stream.

During $CO_2$ desorption, the method may further comprise flowing a heating fluid through the heat exchange flow channels of the article described above to increase the temperature of the article thereby releasing the adsorbed $CO_2$. One example of a heating fluid is steam. In one embodiment, the heating fluid raises the temperature of the article to a temperature sufficient to desorb the sorbed $CO_2$ from the article. It should be appreciated that a sufficient temperature to desorb the $CO_2$ will depend, in part, on the amount of $CO_2$ that is present. In one embodiment, a sufficient temperature can comprise heating the article to a temperature in the range of from 60° C. to 150° C., including, for example, temperatures of 80° C., 100° C., 120° C., or 140° C. or above. In another embodiment, the sufficient heating temperature can be in the range derived from these values, including for example, a range from 100° C. to 120° C., or 100° C. to 140° C.

Figure 4:
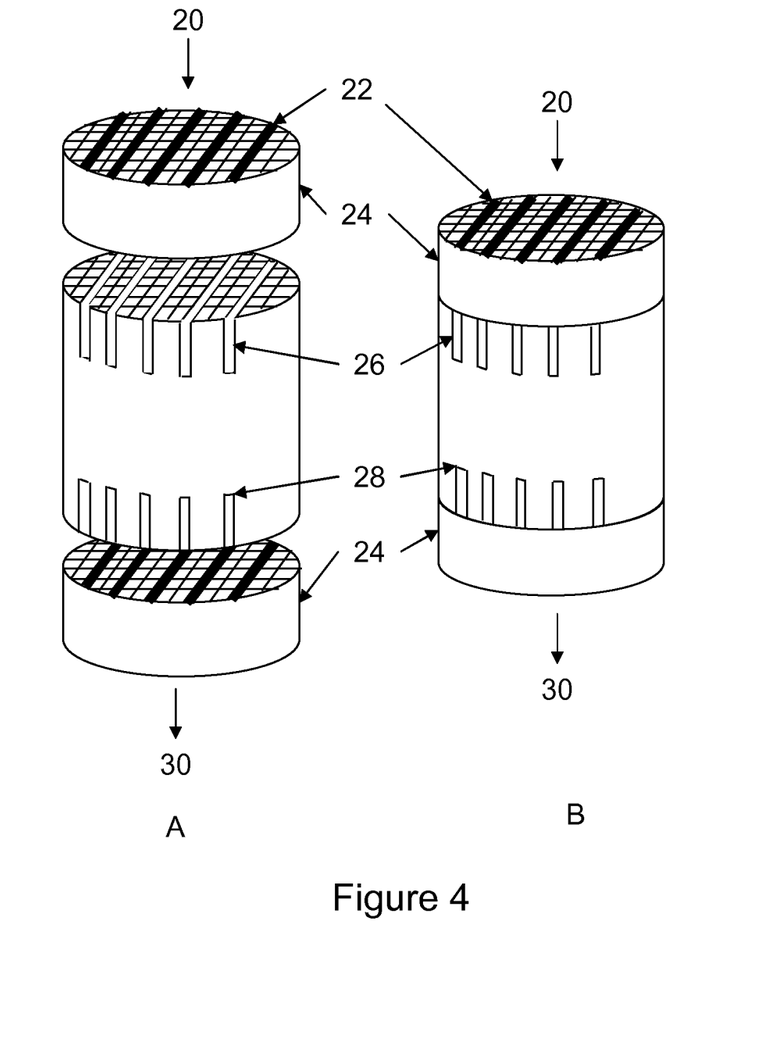
FIG. 4 is one embodiment disclosed herein showing an inlet-outlet example for heat exchange flow and end sealing.

One embodiment of the disclosed article for $CO_2$ capture from a gas stream is shown in FIG. 4. At the two ends of the article, slots 26, 28 are cut at the heat exchange flow channels for interconnecting these heat exchange flow channels as well as for introducing heating/cooling fluid from the side of the article. Two caps 24 on which the channels matching the heat exchange flow channels are plugged 22, for example, with cement and are then glued and sealed at the two ends of the article. The gas stream to be treated 20 can be introduced at one end of the article and the treated gas flow 30 exits from the other end. The heating/cooling fluid is introduced at the flow inlet slots 28 and exits at the flow outlet slots 26, or vice versa.

After desorption the article may be cooled by flowing cooling fluid, such as cooling water, through the slots at the side of the article. By heating and cooling individual channels in the article, the heating and cooling can be very efficient. In some embodiments, the barrier layer can effectively conduct heat from one side/channel to the other/channel.

Various embodiments will be further clarified by the following examples.

EXAMPLES

Advantages of the heat exchange flow channel functionality are illustrated through modeling the behavior of embodiments of the article. The results of the model may be used to provide guidance in sorbent and barrier material thickness selection.

Figure 5:
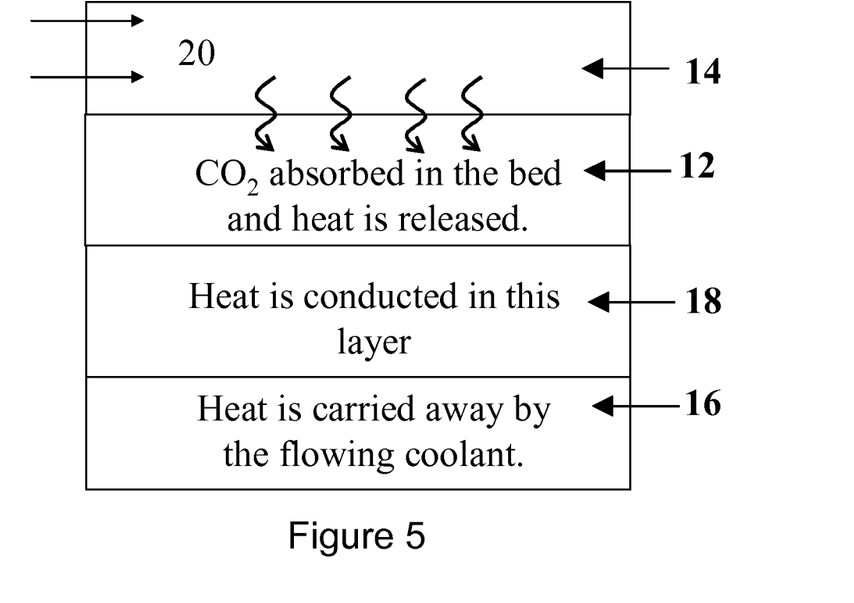
FIG. 5 is a 2D schematic representation of a complex 3D honeycomb structure with heat exchange flow channels.

A honeycomb structure can be thought of as a collection of isolated combinations of one reaction flow channel and one heat exchange flow channel. As shown in the embodiment of FIG. 2, all the reaction flow channels 14 (with 4 sides) have only one side in contact with the heat exchange flow channels 16, while the other three sides are in contact with the reaction flow channels 14. If the interaction of one reaction flow channel with another reaction flow channel is assumed to be small, then for modeling purposes, a model for a single reaction flow channel with a heat exchange channel on one side would be representative of the whole honeycomb structure. Such an assumption would be valid when most of the heat flows from the reaction flow channel to the heat exchange flow channel, and an insignificant amount flows between reaction flow channels. If diffusion within the porous channel wall is small, then adsorption effects are limited within reaction flow channels and there are no interactions between the reaction flow channels in terms of adsorption. Therefore, FIG. 5, illustrating one side of a reaction flow channel 14 in contact with one side of a heat exchange flow channel 16, is a simple 2D analogy of a complex 3D honeycomb structure with heat exchange flow channels.

Figure 6:
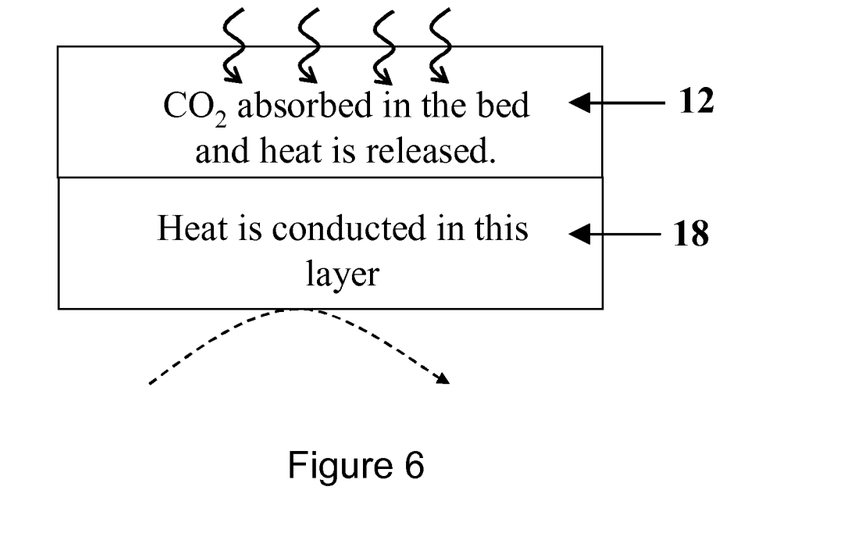
FIG. 6 is a schematic representation of the modeling analysis domain.

FIG. 6 is a schematic representation of the analysis domain used for modeling purposes and is based on following assumptions:

The $CO_2$ concentration of the gas stream in the reaction flow channels is not changing, and not solved for in the reaction flow channels. Therefore, the reaction flow channel domain is ignored from the analysis domain, replaced by constant $CO_2$ concentration boundary condition at the interface of reaction flow channel and sorbent.

The cooling fluid takes away heat from the surface as convective heat transfer. Therefore, the heat exchange flow channel domain is ignored from the analysis domain, replaced by constant convective heat transfer boundary condition at the interface of barrier layer and sorbent.

The barrier layer can only conduct away heat.

$CO_2$ adsorption in the sorbent body is not diffusion limited. The sorbent at all thicknesses is equally accessible to $CO_2$.

Mathematical Model:

Mass Balance:

$CO_2$ adsorption is solved for in the sorbent body, Zeolite 13X in this example. Diffusion inside the sorbent body is ignored. The $CO_2$ adsorption capacity of the sorbent body is estimated from Langmuir isotherms. The capacity of the sorbent body is a function of temperature.

Energy Balance:

Conductive heat transfer equation is solved for in both the sorbent body layer and the barrier layer. In the sorbent body, there is an additional volumetric heat source term (due to energy released from adsorption reaction). The barrier layer can only conduct away heat. The model input data is shown in Table 1 and the results are presented in FIGS. 7, 8, 9, 10, 11, 12, 13, 14 and 15.

TABLE 1

| Model Input data | | |
|---|---|---|
| Parameters | Value | Unit |
| Zeolite (sorbent body) | | |
| Density | 640 | kg/m3 |
| Thermal Conductivity | 0.12 | W/m/K |
| Specific Heat Capacity | 920 | J/kg/K |
| Glass (barrier layer) | | |
| Density | 2800 | kg/m3 |
| Thermal Conductivity | 1.05 | W/m/K |
| Specific Heat Capacity | 840 | J/kg/K |
| Polymer (barrier layer) | | |
| Density | 1000 | kg/m3 |
| Thermal Conductivity | 0.17 | W/m/K |
| Specific Heat Capacity | 1200 | J/kg/K |

TABLE 1-continued

Model Input data

| Parameters | Value | Unit |
|---|---|---|
| Dimensions | | |
| Sorbent thickness | 380 | microns |
| Barrier layer thickness | 100 | microns |

Figure 7:
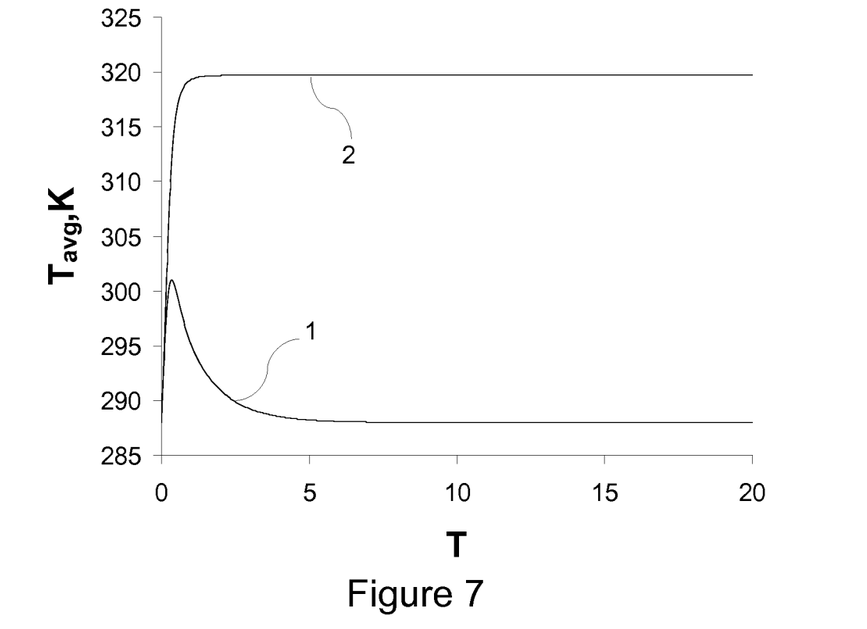
FIG. 7 is a graph showing the average temperature in degrees K ($T_{avg}$) plotted against time in seconds (T) which illustrates the effectiveness of the heat exchange flow channel on article temperature.
Figure 8:
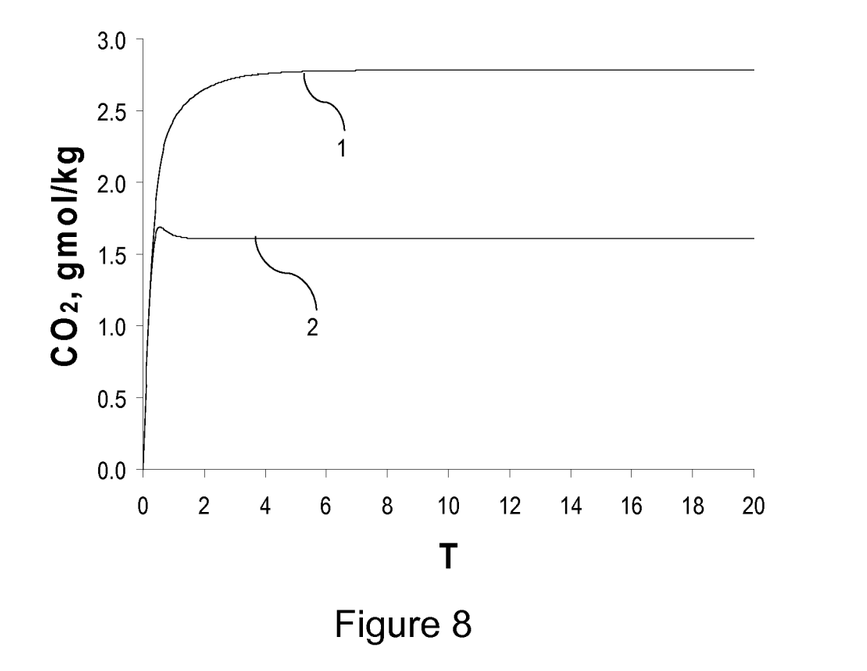
FIG. 8 is a graph showing the $CO_2$ amount in the article in gmol of $CO_2$ per kg of sorbent ($CO_2$), plotted against time in seconds (T), which illustrates the effectiveness of the heat exchange flow channel on $CO_2$ capture capacity.

FIG. 7 shows the effectiveness of using a heat exchange flow channel 1, compared to no heat exchange flow channel 2, to keep the sorbent body temperature close to the initial temperature. Increase in the $CO_2$ amount in the sorbent body with a heat exchange flow channel 1, compared to no heat exchange flow channel 2, is shown in FIG. 8. The $CO_2$ capture capacity of the sorbent body decreases with rise in sorbent body temperature; therefore a maximum capacity of the sorbent body is available when a heat exchange flow channel is used.

Figure 9:
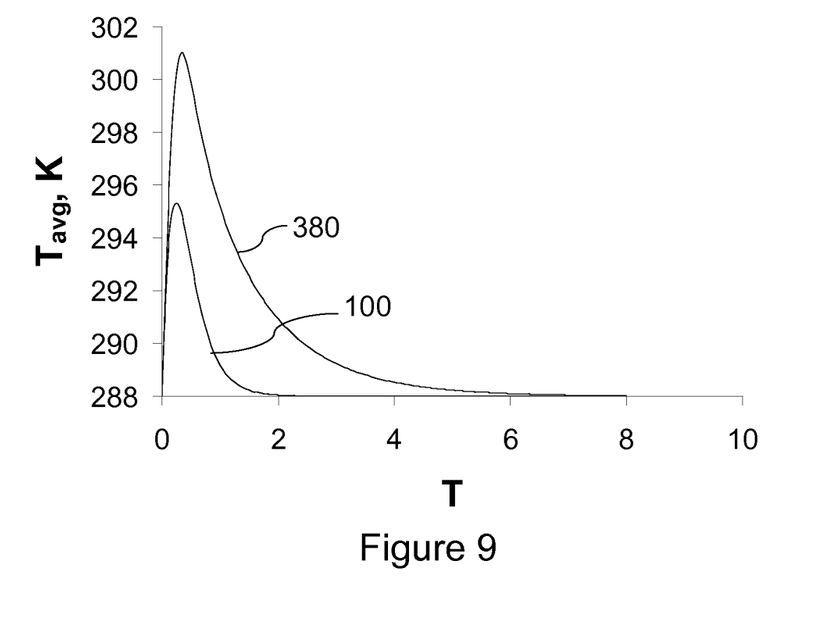
FIG. 9 is a graph showing the average temperature in degrees K ($T_{avg}$) plotted against time in seconds (T) which illustrates the effect of sorbent thickness in maintaining the article temperature.
Figure 10:
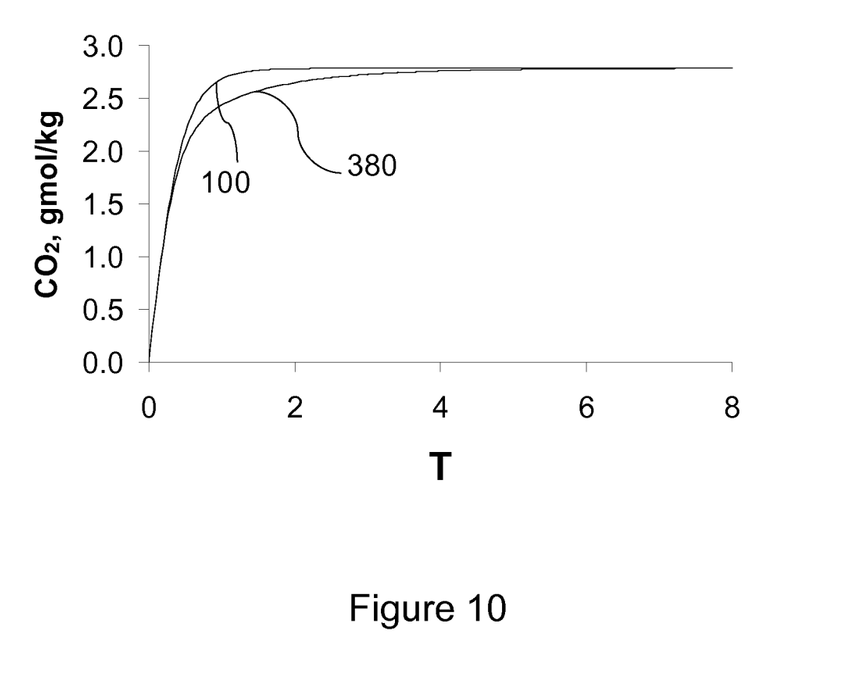
FIG. 10 is a graph showing the $CO_2$ amount in the article in gmol of $CO_2$ per kg of sorbent ($CO_2$), plotted against time in seconds (T), which illustrates the effect of sorbent thickness on sorbent body $CO_2$ capture capacity.
Figure 11:
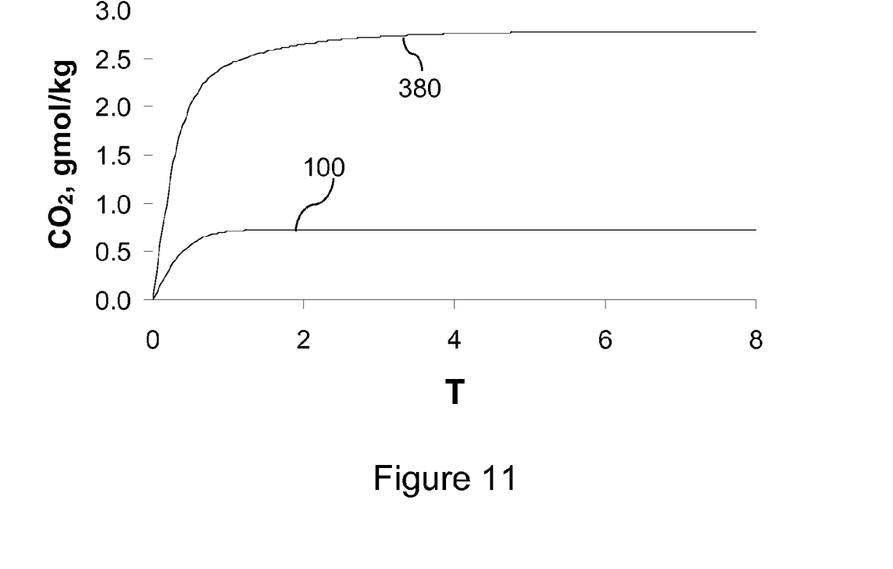
FIG. 11 is a graph showing the $CO_2$ amount in the article in gmol of $CO_2$ per kg of sorbent ($CO_2$), plotted against time in seconds (T), which illustrates the impact of sorbent thickness on amount of $CO_2$ adsorbed.
Figure 12:
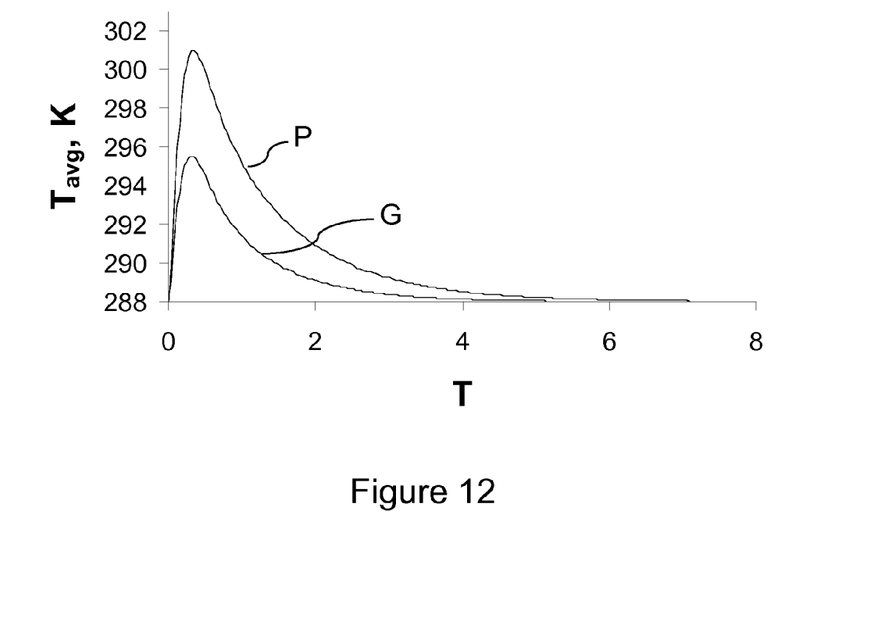
FIG. 12 is a graph showing the average temperature in degrees K ($T_{avg}$) plotted against time in seconds (T) which illustrates the effect of glass (G) vs. polymer (P) barrier layer on heat conduction.
Figure 13:
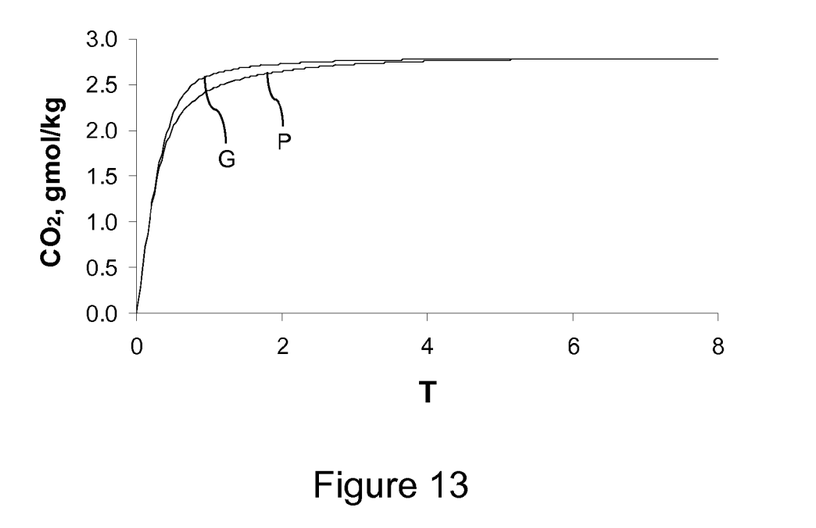
FIG. 13 is a graph showing the $CO_2$ amount in the article in gmol of $CO_2$ per kg of sorbent ($CO_2$), plotted against time in seconds (T), which illustrates the effect of glass (G) vs. polymer (P) barrier layer on sorbent body $CO_2$ capture capacity.

The effect of sorbent thickness in maintaining the temperature of the sorbent body closer to initial temperature is shown in FIG. 9. When the sorbent thickness is 100 microns, the heat is removed faster and therefore the sorbent body temperature does not rise much, in comparison to 380 microns. The difference in temperature rise between 380 microns and 100 microns sorbent thickness, do not cause any significant change in sorbent body $CO_2$ capture (shown in FIG. 10), but there is significant change observed in the total amount of $CO_2$ adsorbed (shown in FIG. 11), as the amount of sorbent for 100 microns is less.

In embodiments where glass is used as a barrier material, heat is removed faster; therefore the sorbent body temperature does not rise by much (shown in FIG. 12), when compared to polymer material barrier layer. The reason for above observation is that polymer is not as good a heat conductor as glass. The difference in temperature rise between embodiments with glass barrier layer and polymer barrier layer, do not cause any significant change in sorbent body $CO_2$ adsorbed by sorbent body (shown in FIG. 13).

Figure 14:
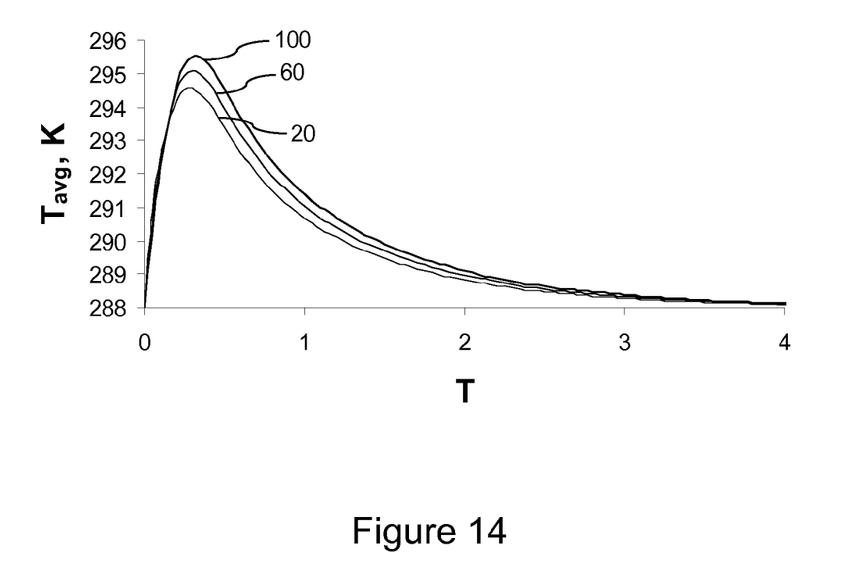
FIG. 14 is a graph showing the average temperature in degrees K ($T_{avg}$) plotted against time in seconds (T) which illustrates the effect of glass barrier layer thickness on heat conduction.
Figure 15:
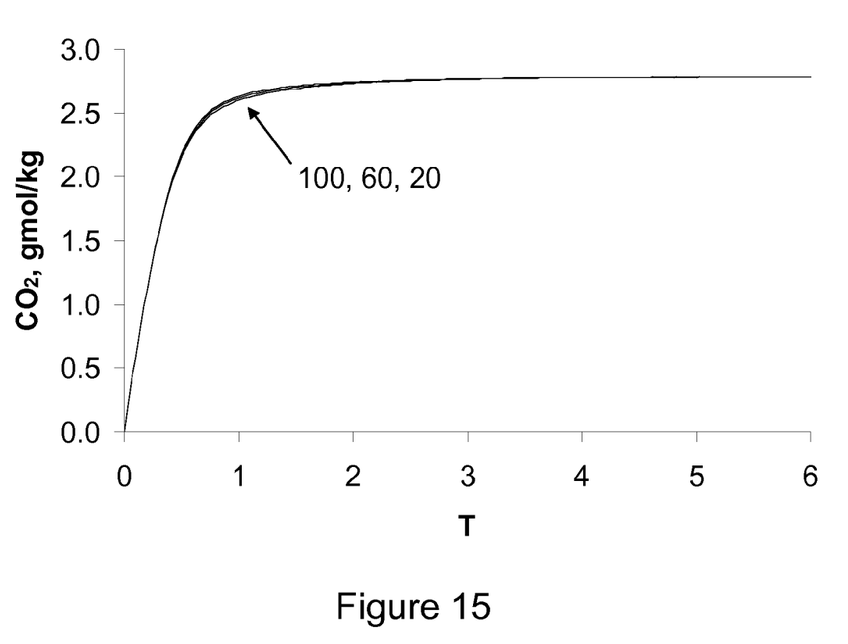
FIG. 15 is a graph showing the $CO_2$ amount in the article in gmol of $CO_2$ per kg of sorbent ($CO_2$), plotted against time in seconds (T), which illustrates the effect of glass barrier layer thickness on sorbent body $CO_2$ capture capacity.

The effect of glass barrier layer thickness in removing heat from an embodiment is shown in FIG. 14. There is a very small difference in the rate of removal with change in barrier layer thickness from 20 to 100 microns. The change in the amount of $CO_2$ adsorbed is insignificant (shown in FIG. 15) as barrier layer thickness is increased from 20 to 100 microns. This concludes that barrier layer thickness between 20 and 100 microns is not a limiting variable in heat transfer for the present embodiment.

It should be understood that while the invention has been described in detail with respect to certain illustrative embodiments thereof, it should not be considered limited to such, as numerous modifications are possible without departing from the broad spirit and scope of the invention as defined in the appended claims.

Unless otherwise indicated, all numbers used on the specification and claims are to be understood as being modified in all instances by the term "about", whether or not so stated. It should also be understood that the precise numerical values used on the specification and claims form additional embodiments of the invention.

What is claimed is:

1. An article for removing $CO_2$ from a gas stream, the article comprising:
a plurality of intersecting walls having a porosity greater than 50 percent and outer surfaces that define a plurality of cells extending from one end to a second end of the article, the plurality of cells comprising at least a first subset of cells and a second subset of cells; and
a barrier layer disposed on the walls of each cell in the first subset of cells to form a plurality of heat exchange flow channels, the porosity of the walls on which the barrier layer is disposed being greater than 50 percent;
wherein the walls of each cell in the first and the second subset of cells comprise a $CO_2$ sorbent material; and
wherein the walls of each cell in the second subset of cells form a plurality of reaction flow channels, and do not comprise a barrier layer.

2. The article of claim 1, wherein the intersecting walls have a thickness of from 35 microns to 500 microns.

3. The article of claim 1 comprising a shaped body of sorbent material.

4. The article of claim 1, wherein the barrier layer comprises a minimum thickness of 10 microns.

5. The article of claim 1, wherein the barrier layer comprises a thickness from 10 microns to 100 microns.

6. The article of claim 1, wherein the barrier layer comprises polymer, glass, metal, ceramic, glass-ceramic, or combinations thereof.

7. The article of claim 1, wherein the article comprises a honeycomb.

8. The article of claim 1, wherein the intersecting walls comprise ceramic, glass, glass-ceramic, metal or combinations thereof.

9. The article of claim 1, having a void fraction less than 70 percent.

10. The article of claim 1, comprising a void fraction greater than 70 percent.

11. The article of claim 1, comprising a cell density of from 100 cells per square inch to 5000 cells per square inch.

12. The article of claim 1, wherein the reaction flow channels and heat exchange flow channels have different cross-sectional areas.

13. The article of claim 1 wherein the walls of the heat exchange flow channels comprise a $CO_2$ sorbent material.

14. The article of claim 1 wherein the barrier layer comprises a layer disposed on intersecting walls.

15. The article of claim 1, wherein the heat exchange flow channels have a larger cross section than the reaction flow channels.

16. The article of claim 1, wherein the intersecting walls of the first subset of cells and the second subset of cells are impregnated with a solid sorbent.

17. The article of claim 1, wherein the intersecting walls of the second subset of cells are impregnated with a solid sorbent.

18. The article of claim 17, wherein solid sorbent in the intersecting walls is greater than 150 grams per liter of intersecting wall.

19. The article of claim 17, wherein the solid sorbent impregnates an entire thickness of the intersecting walls.

20. The article of claim 17, wherein the solid sorbent impregnates the intersecting wall to a depth of at least 100 microns.

21. A method of making the article for removing $CO_2$ from a gas stream of claim 1, the method comprising:
providing a substrate comprising intersecting walls having outer surfaces that define a plurality of cells extending from one end to a second end;
wherein the intersecting walls have a median pore size greater than 10 microns;
wherein the porosity of the intersecting walls is greater than 50 percent;

impregnating the intersecting walls with a solid sorbent capable of adsorbing $CO_2$;
   wherein the amount of solid sorbent in the intersecting walls is greater than 150 grams per liter of substrate;
masking the ends of selected cells of the substrate;
applying a barrier layer on the intersecting walls of the unmasked cells;
removing the mask, and
drying, and optionally firing, the article.

22. A method of removing $CO_2$ from a gas stream, the method comprising:
   contacting a gas stream comprising $CO_2$ with the reaction flow channels of the article of claim 1 thereby adsorbing $CO_2$ on the article; and
   flowing a cooling fluid through the heat exchange flow channels of the article;
      wherein the cooling fluid acts to remove the heat resulting from the adsorption of the $CO_2$.

23. The method of claim 22, further comprising:
   flowing a heating fluid through the heat exchange flow channels of the article of claim 1 to increase the temperature of the article thereby releasing the adsorbed $CO_2$.

* * * * *